United States Patent
Herdy, Jr.

(10) Patent No.: US 6,779,335 B2
(45) Date of Patent: Aug. 24, 2004

(54) BURNING NITROUS OXIDE AND A FUEL

(76) Inventor: Joseph Roger Herdy, Jr., 127 Markyle Dr., Owens Cross Roads, AL (US) 35763

( * ) Notice: Subject to any disclaimer, the term of this patent is extended or adjusted under 35 U.S.C. 154(b) by 0 days.

(21) Appl. No.: 10/004,831

(22) Filed: Dec. 7, 2001

(65) Prior Publication Data

US 2002/0092290 A1 Jul. 18, 2002

Related U.S. Application Data

(60) Provisional application No. 60/254,003, filed on Dec. 7, 2000.

(51) Int. Cl.[7] ............................................... F23R 3/40
(52) U.S. Cl. ......................................... 60/205; 60/257
(58) Field of Search ........................ 60/205, 218, 257, 60/211

(56) References Cited

U.S. PATENT DOCUMENTS

| | | | |
|---|---|---|---|
| 5,160,713 A | | 11/1992 | Mazanec et al. |
| 5,314,673 A | * | 5/1994 | Anseth et al. ............ 423/239.1 |
| 5,823,478 A | * | 10/1998 | Dunn ......................... 244/172 |
| 6,250,072 B1 | * | 6/2001 | Jacobson et al. ............. 60/251 |
| 6,367,244 B1 | * | 4/2002 | Smith et al. .................. 60/251 |

* cited by examiner

*Primary Examiner*—Ehud Gartenberg
(74) *Attorney, Agent, or Firm*—Hunton & Williams

(57) ABSTRACT

An apparatus is provided for burning a fuel and nitrous oxide. The apparatus has a combustor, a catalyst, a nitrous oxide supply passage for directing the nitrous oxide to a contact position with the catalyst, and a fuel supply passage for supplying the fuel to the combustor. The catalyst is for facilitating decomposition of the nitrous oxide, and the combustor is for burning the fuel, the decomposed nitrous oxide and/or further nitrous oxide decomposed in the reaction.

62 Claims, 4 Drawing Sheets

INJECTOR DESIGN FOR $N_2O$ AND $C_3H_8$ USED IN NOP ROCKET 2

INJECTOR DESIGN FOR $N_2O$ AND $C_3H_8$ USED IN NOP ROCKET 2

Rocket thrust coefficient as a function of mixture ratio for two different combustor L*.

BURNING NITROUS OXIDE AND A FUEL

This application claims the benefit of U.S. Provisional Application No. 60/254,003, filed Dec. 7, 2000.

BACKGROUND OF THE INVENTION

Embodiments of the invention relate to burning fuels. More particularly, embodiments of the invention relate to burning fuels with nitrous oxide.

SUMMARY OF THE INVENTION

Embodiments of the invention include an apparatus for burning a fuel and nitrous oxide. The apparatus has a combustor, a catalyst, a nitrous oxide supply passage for directing the nitrous oxide to a contact position with the catalyst, and a fuel supply passage for supplying the fuel to the combustor. The catalyst is for facilitating decomposition of the nitrous oxide, and the combustor is for burning the fuel and the decomposed nitrous oxide.

Other embodiments of the invention include a rocket engine. The rocket engine has a nozzle, a combustor, and a propellant supply system. The propellant supply system has a catalyst, a nitrous oxide supply passage for directing nitrous oxide to a contact position with the catalyst, and a fuel supply passage for supplying a fuel to the combustor. The catalyst is for facilitating decomposition of the nitrous oxide, and the combustor is for burning the fuel and the decomposed nitrous oxide.

Other embodiments of the invention include a method of burning nitrous oxide and a fuel. The method includes supplying the nitrous oxide to a catalyst, facilitating decomposition of the nitrous oxide by passing the nitrous oxide over the catalyst, supplying the fuel to a combustion point, and supplying the decomposed nitrous oxide to the combustion point.

DETAILED DESCRIPTION OF PREFERRED EMBODIMENTS

Figure 1:
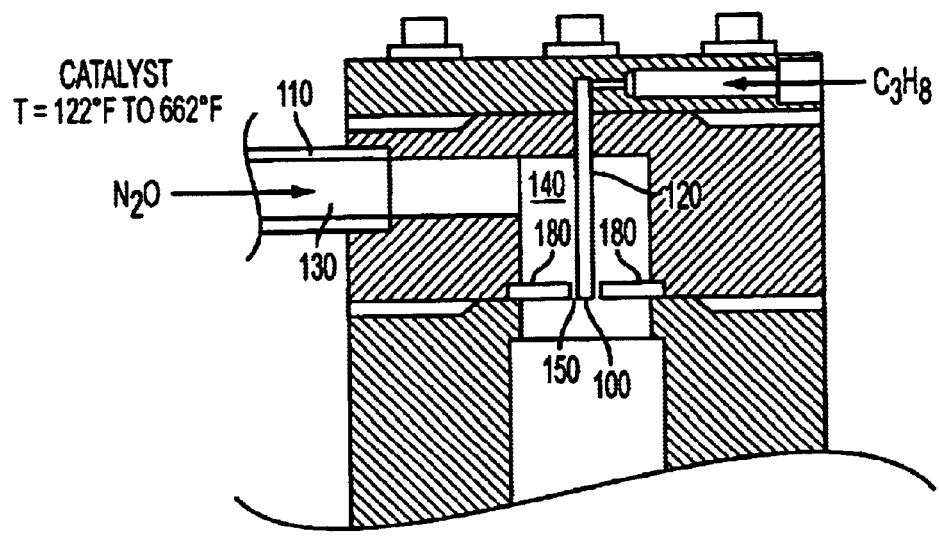
FIG. 1 is a sectional view of an injector in accordance with an embodiment of the invention.

The invention provides a nitrous oxide ($N_2O$)/propane ($C_3H_8$) rocket engine (NOP), or any other hydrocarbon fuel, that utilizes catalytic decomposition of $N_2O$ as an igniter system. This propellant combination is an alternative to the present space propulsion systems that use hypergolic or cryogenic liquids, or solid propellants. Various features of the invention are discussed below by way of examples. The invention is not limited to these illustrative examples and has a scope that should be clear to one skilled in the art upon reading this disclosure.

A serious limitation on the ability of the commercial aerospace industry to place into and keep satellites in Low-Earth-Orbit (LEO) at economical prices is the choice of propellants and propulsion technologies used for rocket boost, attitude control systems (ACS), reaction control systems (RCS), orbital maneuvering systems (OMS), and auxiliary power units (APU). Present systems are either liquid propellants that are hypergolic or cryogenic, or solid propellants that are single use only, are unthrottleable, and are explosive in nature.

The invention provides a solution to the problem by selecting propellants for a chemical propulsion system that are readily available, are easier to handle, non-toxic, produce relatively high performance, and provide significant reduction in cost of operations. High operating costs are a result of occupational safety requirements associated with the handling of toxic, hypergolic propellants and of added complication of operating a cryogenic propellant system. A cryogenic system also adds considerable dry weight, further reducing the payload weight fraction.

By using nontoxic, benign propellants that are relatively safe to handle, low cost can be realized through simplified ground operations. Such a propellant combination could also benefit other systems for which safe and simple ground operations are a requirement. Rocket assisted takeoff systems (RATO) for unmanned aerial vehicles (UAV) could benefit from a system that would provide simplified ground operations since these systems may be deployed in future battlefield scenarios. Military personnel would benefit from the safe handling characteristics of benign propellants, and superior performance to other propellant combinations allowing the UAV to perform its mission with lower risk of neutralization by the enemy.

The invention exploits several unique properties of the propellants, propane and nitrous oxide, for a chemical rocket propulsion system. These self-pressurizing propellants have a distinct advantage over current systems that use hydrazine as a monopropellant and monomethyl-hydrazine and nitrogen tetroxide (MMH/NTO) as bipropellants. They are standard liquefied industrial gases and are classified by the U.S. Department of Transportation as simple asphyxiates, with propane as a flammable gas and nitrous oxide as a mild oxidizer. They are neither highly explosive nor hazardous to work with or handle. A chemical liquid propulsion system in accordance with the invention, using these environmentally benign propellants, may be economically advantageous to current hypergolic or cryogenic systems. They possess commercial availability at low prices and are easy to handle, thereby producing a significant reduction in operating costs.

A feature of nitrous oxide facilitates autoignition of propane without the use of hypergolics. Nitrous oxide can be catalytically decomposed using a wide variety of catalysts, including, for example, platinum, iridium, rhodium, tungsten carbide, copper, cobalt, and gold. This catalytic decomposition is discussed herein using a number of catalysts including, but not limited to, the iridium based Shell 405, which has a space flight heritage as a hydrazine catalyst. The decomposition process is exothermic resulting in nitrogen and oxygen at 2988° F., for complete decomposition. This hot oxidizer will autoignite propane (and most hydrocarbon fuels) on contact and will facilitate sustained combustion in a rocket combustion chamber. Using this technique, autoignition and rigorous and complete combustion can be accomplished using stable, non-toxic, storable propellants. Along the same lines nitrous oxide could be decomposed and used as a monopropellant in a similar fashion as hydrazine and hydrogen peroxide rocket systems. Although the NOP rocket concept deals specifically with nitrous oxide and propane as propellants, the greater invention is one of using nitrous oxide as an oxidizer and ignition source for use alone as a monopropellant or with a fuel as a bipropellant.

Nitrous oxide has added benefit as a space propellant in that it stores as a liquid and injects as a gas. This is important for attitude control (AC), since liquid injection rockets cannot provide the shorter pulse times required for an ACS mission. Liquid storage gives tremendous weight benefit since a liquid tank can hold many times its own weight in propellant, whereas the same is not true for gas storage systems.

Due to the versatility of nitrous oxide as both a monopropellant and oxidizer for a bipropellant system, the potential exists to set up a multi-mode propulsion system, which will improve space mission capability by reducing the dry weight overhead. A single propellant system serving all space propulsion missions from attitude control to orbital maneuvering would reduce the component count, system weight, and cost. Lower dry weight can be converted into higher payload weight fraction or $\Delta V$.

Most propellants commonly used today have relatively low vapor pressure (lower than the rocket chamber pressure) and consequently require a separate expulsion system. In contrast to these systems, the NOP propellants are self-pressurizing due to their relatively high vapor pressures (higher than the rocket chamber pressure). Consequently, they do not require separate expulsion systems and the entire tank volume can be used to store propellant. The vapor pressure of nitrous oxide is approximately 750 psi and that of propane is 110 psia at ambient temperature.

The vapor pressure of propane is slightly low for it to be used as a true self-pressurizing propellant. For a NOP rocket system, high-pressure nitrous oxide vapor could be used as a pressurant gas for the propane by, for example, means of a bladder or diaphragm. Ethylene may also be appropriate as a propane replacement due to its higher vapor pressure.

The NOP rocket offers a non-toxic, environmentally benign propellant combination that is storable in space over long periods of time and offers comparable specific impulse to current systems. The non-toxic nature of the NOP propellants will serve to reduce operating costs due to the handling issues associated with the hypergolic propellants currently in use for space applications. The NOP propellants are benign and not highly reactive. They remain so until the nitrous oxide is catalytically decomposed and combined with the fuel. Exhaust products are mainly nitrogen, water, and carbon dioxide. Another beneficial feature of the NOP rocket propellants are that they are storable over long periods of time without degradation. For example, inadvertent decomposition is one of the main technical obstacles for hydrogen peroxide use in space propulsion systems.

Tests have been conducted of a NOP rocket utilizing nitrous oxide ($N_2O$) as the oxidizer and propane ($C_3H_8$) as the fuel. The chamber pressure was 150 psia for this 50 $lb_f$ rocket, and a fuel-rich propellant combination was used to minimize combustion instabilities. According to common practice for space-based thrusters, a pressure drop between 20–30% of chamber pressure is taken across the injectors, requiring an injection pressure of approximately 180 psia in this example.

The injector design for a NOP rocket engine prototype, shown in FIG. 1, is a single element, coaxial (single) swirl injector, with liquid injection of propane and two-phase phase injection of nitrous oxide. Swirl tends to increase mixing and decrease the required characteristic combustor length L* and is generated by tangentially injecting the propellant off-center, with respect to the orifice through-hole. In general, swirl is better for mixing two flows and more simple than a showerhead injector design and swirl injectors operate over a wider range of conditions and are more forgiving than other types of injectors.

As shown in FIG. 1, the liquid $C_3H_8$ fuel is injected into an inside orifice 100 and the oxidizer is injected into an outside annulus 150, between a $C_3H_8$ injector tube 120 and a sintered mesh disc 180. Initial consideration was given to a design with the fuel on the outside, coating the hot combustor walls (made of Glid-Cu, a Cu-0.15% alumina alloy) thus protecting the inner walls from oxidation. However, injection of liquid propane in a narrow annulus is not preferred, since the liquid propane surface tension may lead to asymmetric injection. Although copper is not prone to oxidation, refractory metals such as columbium (commonly used for space applications) and tungsten are indeed vulnerable to oxidation.

In this example, the liquid propane injector is sized for an injector pressure drop of 30%$P_c$, and the gaseous nitrous-oxide injector is sized for a pressure drop of 20%$P_c$. The liquid propane injector is designed for a nominal pressure drop of 45 psid at the orifice. For a nominal flow rate of 0.0149 $lb_m$/sec, at injection conditions of 70° F. and 195 psia, an orifice diameter of 0.032" is used. A ¼" S.S. tube (0.194" I.D.) feeds into the 0.032" propane injector, which is offset 0.043" from the center of a 0.118" I.D. tube, generating a swirl component. The liquid propane is then injected into the combustor from the 0.118" I.D. tube at about 6 ft/sec.

The $N_2O$ is fed through a ⅜" tube (0.305" I.D.) 130, and into a stagnation chamber 140, where the $N_2O$ flow turns into the sintered mesh disc 180. The sintered mesh in this example is stainless steel and has a one micron porosity, sized to pass the required flow rate with the required pressure drop. The 0.118" I.D. propane tube is preferably at the center of the sintered mesh disc. Approximately 75% of the $N_2O$ flows through the annulus (with an area of ~0.039 $in^2$) between the mesh center hole and the liquid propane injector tube. Approximately 25% of the $N_2O$ will flow through the porous sintered mesh, providing for transpiration cooling. The $N_2O$ injector is designed for a nominal pressure drop of 30 psid across the stainless steel sintered mesh material. The nominal $N_2O$ flow rate through the annulus is 0.149 $lb_m$/sec, at −25° F. and 175 psia. In this example, the $N_2O$ flows over catalyst 110 before entering stagnation chamber 140. however, the $N_2O$ can come in contact with a catalyst at any point before the $N_2O$ is mixed with the fuel (in this example, the $C_3H_8$). For example, sintered mesh disc 180 can be made from a catalyst and would, therefore, serve dual purposes of creating a pressure drop and acting as a catalyst for the decomposition of the $N_2O$.

Work has been performed using an existing atmospheric test stand. A new rocket test stand was designed and constructed for rocket performance and rocket ignition testing. This new rocket test stand features palletized propellant systems, improved propellant system instrumentation, an improved, more robust thrust stand, and adequate room for the rocket exhaust survey and radiometric measurement equipment.

Figure 2:
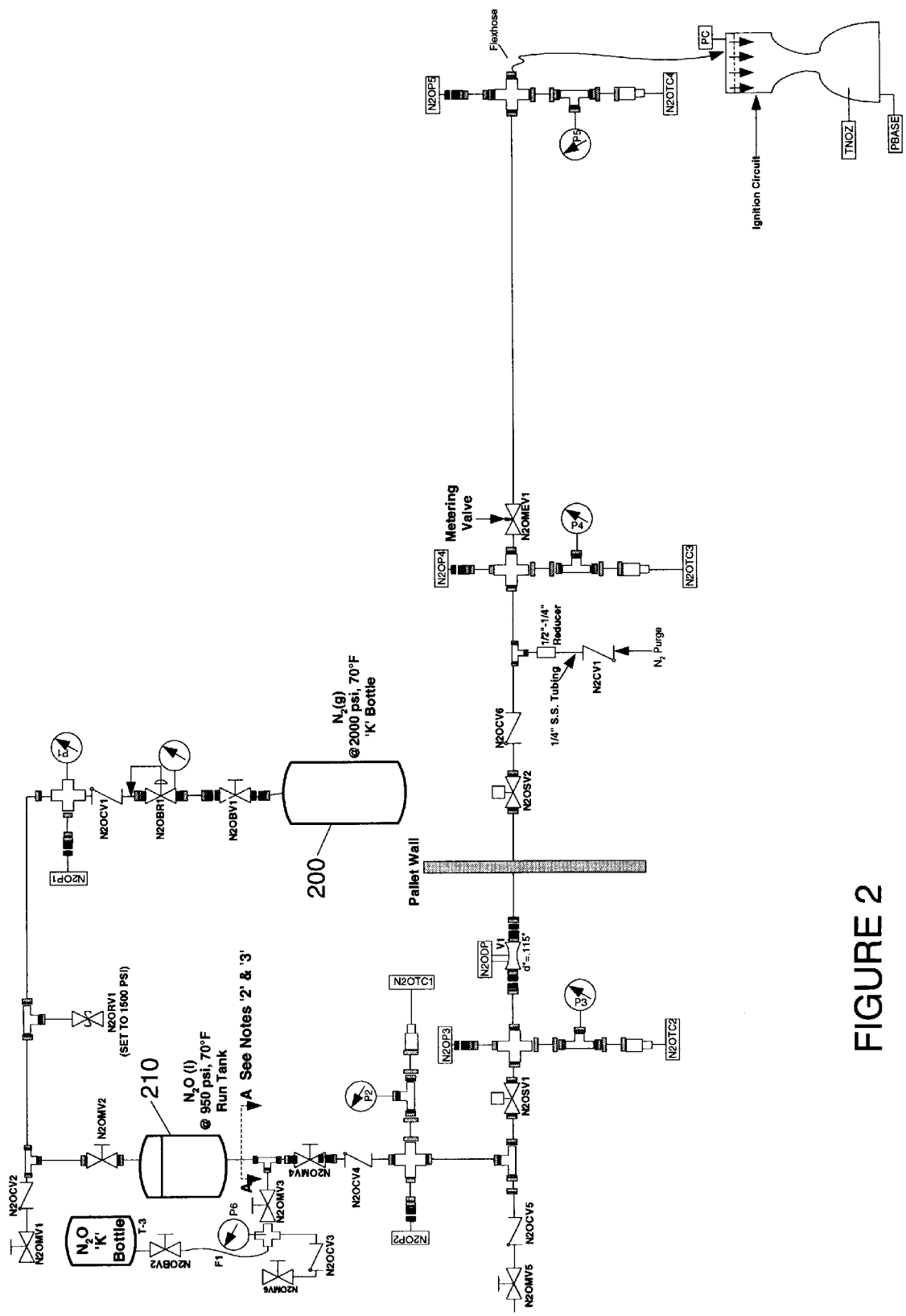
FIG. 2 is an example of a propellant system in accordance with an embodiment of the invention.

The palletized propellant system is shown in FIG. 2. It is noted that both the nitrous oxide and propane systems are similar in layout, except for minor differences in venturi size, metering valve size, and storage tank volume. Both systems will be discussed with reference to FIG. 2.

The basic idea behind the propellant system layout is to provide the user with a safe, modular and self-contained process for loading and pressurizing $N_2O$ and $C_3H_8$ for use in the ignition circuit (spark ignition or catalyst reactor) and rocket engine propellant feed-systems. The propane and nitrous oxide are first loaded into their respective run tanks 210. Tank 200 is a nitrogen pressurization tank, that is used to further pressurize the $N_2O$ and $C_3H_8$ run tanks 210, to ensure that both propellants are in the liquid state at least through the venturi, thus assuring accurate mass flow rate measurements. The propellants experience a large pressure drop through the metering valve, ($\Delta P$~400–700 psi), which adjusts the flow to provide the required $\Delta P$ across the injector. A nitrogen purge circuit is also used to purge the lines before and after the rocket firing sequence is performed. The rocket is mounted on a thrust stand, and is connected to the propellant system by flex lines.

Catalyst research showed that the Shell 405 catalyst successfully decomposes nitrous oxide with moderate light-off temperatures. Shell 405 catalyst has a history of use in space as a hydrazine catalyst material. However, it is recognized that Shell 405 is adverse to repeated use with an oxidizer such as nitrous oxide, and research shows staged catalyst beds containing other elements are preferable for an engine where multiple firings are required.

Nitrous oxide decomposes exothermically with adiabatic decomposition temperature reaching ≈1640° C., (2984° F.). This decomposition is accelerated by a catalyst. Free oxygen available by nitrous oxide decomposition can then be combusted with a wide variety of fuels, with or without the continued supply of decomposed nitrous oxide from the catalyst, as the reaction becomes self-sustaining after initial ignition due to the continued release of heat from combustion. A preferred chemical reaction for the decomposition of nitrous oxide results in the formation of nitrogen and oxygen according to the following reaction equation.

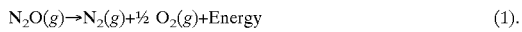

$$N_2O(g) \rightarrow N_2(g) + \tfrac{1}{2} O_2(g) + \text{Energy} \qquad (1).$$

However, heat input is usually required to initiate the decomposition reaction. In the case of thermal decomposition, the activation energy barrier for nitrous oxide is about 250 kJ/mole. There are other intermediate chemical reactions that can lead to oxides of nitrogen, such as NO and $NO_2$, that are undesirable if complete decomposition is to be achieved.

In order to attain homogenous reaction rates, the gas is heated above its auto-decomposition temperature, unless a heterogeneous surface such as a catalyst is incorporated. Catalysts are designed to lower the activation energy barrier, thus allowing the decomposition to occur at much lower temperatures. The principal catalytic action can originate from charge donation into the antibonding orbitals, weakening the N—O bond and thereby lowering the activation energy and thus the reaction temperature.

Various catalyst combinations were tested, over a range of initial pressures and reactor lengths. These catalysts include a platinum monolith, granular tungsten carbide, rhodium (0.17% granular), gold, platinum/palladium monolith, iridium (granular) and a Shell 405-Ir based catalyst bed. Each of these catalysts was preheated to various temperatures (122° F., 303° F., 398° F., 401° F. and 662° F.) using a linear temperature controller to determine the minimum light-off temperature. Catalyst activation requires a minimum initial temperature, with activation increasing as temperature increases. Instabilities occur at temperatures above a given value, which is material dependent.

Chemisorption experiments were conducted to assess the adsorption characteristics of various candidate catalyst materials, a property critical in a heterogeneous catalysis process, as is the case for the NOP rocket catalyst reactor. Conclusions drawn from the relative adsorption tests on Shell-405 and Co-ZSM-5 catalysts, lead to a decision to perform reactive flow studies in an experimental reactor.

Once the adsorption characteristics of the various candidate catalyst materials were understood, the candidate catalyst materials were tested inside a reactor, in order to measure the activity of the catalyst and gain the information required to build a working reactor for the NOP rocket ignition system. The results from these experimental runs suggest that the iridium based catalyst Shell-405, had the highest activity and selectivity towards nitrous oxide decomposition. Experimental results also indicate that cobalt based ZSM-5 catalysts with sodium as promoter metal produced high activity toward the thermal decomposition of nitrous oxide in the presence of a propane/propylene mix.

$N_2O$ catalytic decomposition is achievable at 400° F. for pure nitrous oxide flowing over Shell 405, and, with the use of trace amounts of a hydrocarbon (e.g. Propane or propylene), this temperature is lowered to approximately 200° F.

Shell-405 catalyst was loaded into the atmospheric combustion igniter, resulting in a bed length of about ¼ inch. The reactor was preheated to 148° C. at the inlet. Nitrous oxide at a gage pressure of 117 psig was then flowed through the reactor at 0.015 ACFM. A time delay of about 4 seconds was allowed before the propane/propylene mix was injected into the reactor at 103 psig pressure and a flow rate of about 1 cc/sec. At that instant a flame was observed at the exit of the reactor. The flow of the propane mix and nitrous oxide were then shut-off and the reactor purged with $N_2$. The flows were then restarted and a flame was again observed at the exit. This procedure was repeated 6 times and each time the propane mix was turned on a flame was observed. This reactor was fired approximately 15 times in rapid succession, displaying robustness in the catalyst reactor operation.

For comparison purposes, plots of the theoretical vacuum $I_{sp,vac}, I_{sp}$, and c*, obtained from a NASA chemical equilibrium code, are presented. Initial results are promising, showing rocket performance consistent with theoretical predictions taking into account the effects of heat transfer.

Figure 3:
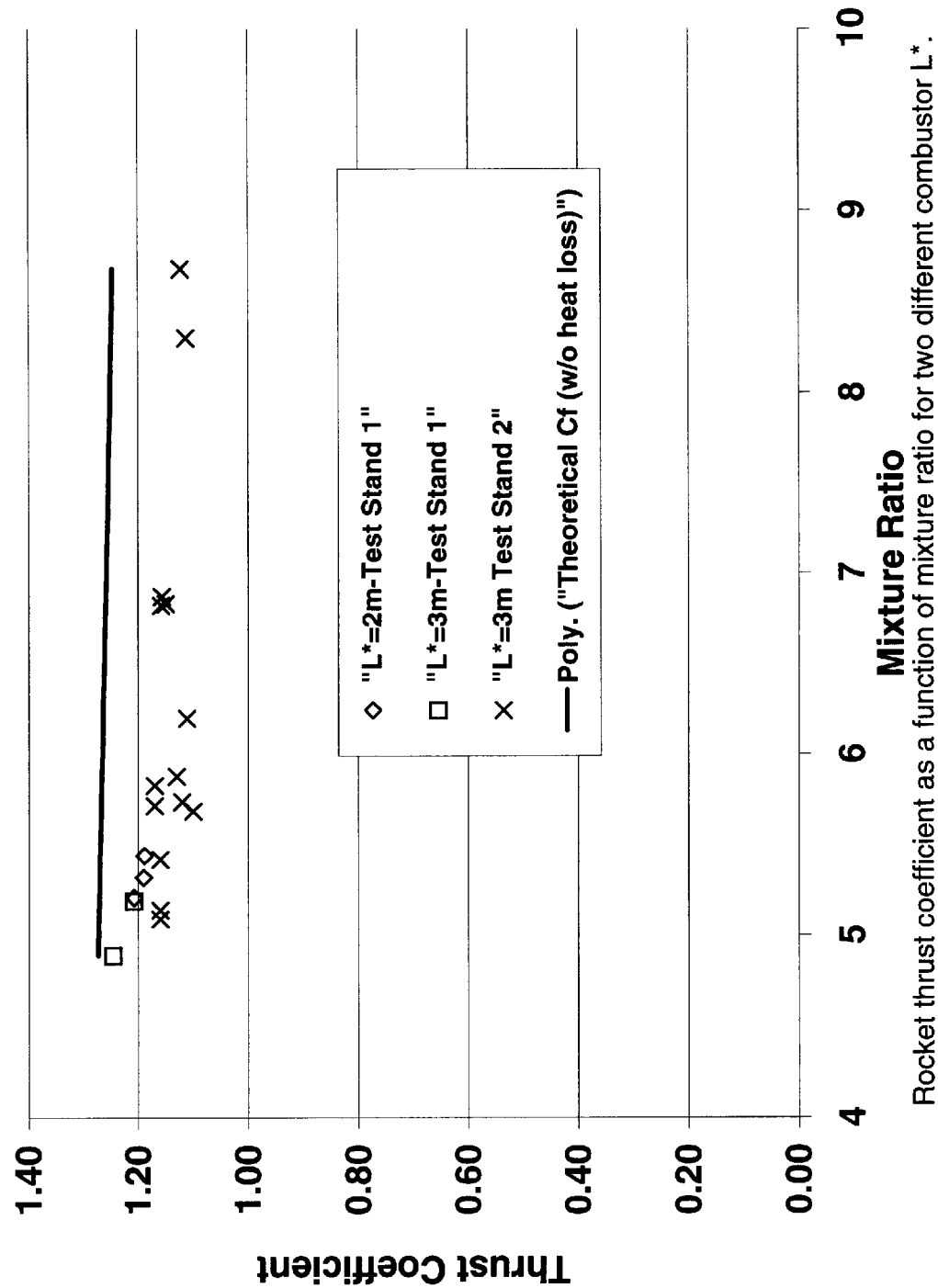
FIG. 3 shows a plot of thrust coefficient versus mixture ratio.

FIG. 3 shows the variation in the thrust coefficient for a test rocket (evaluated on Test Stands 1 and 2) as a function of mixture ratio for two combustor lengths, L*=2 m and 3 m. The average thrust coefficient measured on Test Stand 1 is 1.21, compared with a theoretical value (neglecting heat losses) of 1.27, and a measured value of 1.14 on Test Stand 2, compared with a theoretical value (neglecting heat losses) of 1.26.

A rocket test stand facility, equipped with palletized propellant feed systems, 1000 lbs$_f$ thrust stand, and data acquisition systems, was built to test a nitrous oxide/propane (NOP) rocket engine. The NOP rocket was tested over a range of mixture ratios (4.89<M.R.<8.68). An ignition concept using catalytically decomposed nitrous oxide to autoignite propane, was explored and various catalyst materials were evaluated. Shell-405 and cobalt based ZSM-5 showed promising reactivity, demonstrating sufficient decomposition of $N_2O$ to ignite hydrocarbon fuels. Laboratory experiments with the catalyst reactor have shown that $N_2O$ catalytic decomposition is achievable at 400° F. for pure nitrous oxide flowing over Shell 405, and, with the use of trace amounts of a hydrocarbon (eg. propane or propylene), this temperature is lowered to approximately 200° F.

In addition to developing the catalyst ignition system, NOP rocket performance was experimentally determined to match well with theoretical predictions, with proper modeling of heat losses. Radiometric measurements were also used to determine rocket exhaust temperature and plume composition and plume pitot probe measurements provided another method for verifying thrust data.

Figure 4:
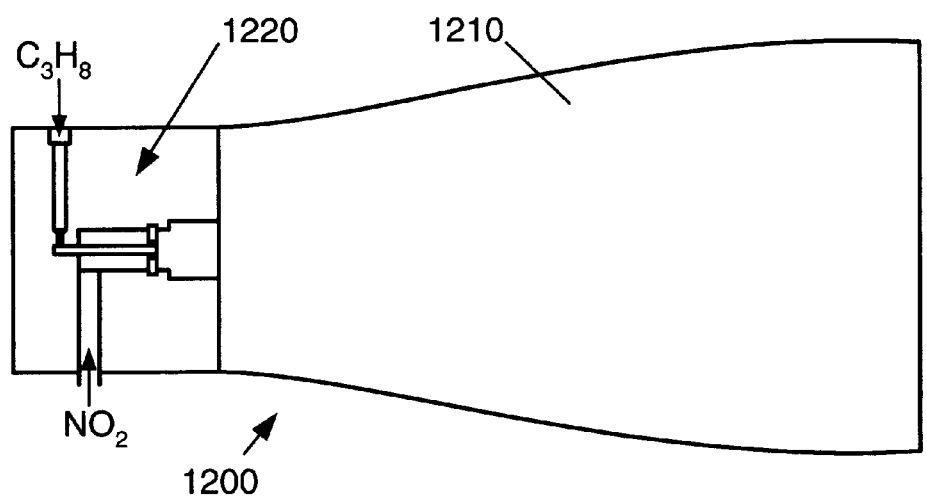
FIG. 4 shows a rocket engine in accordance with an embodiment of the invention.

FIG. 4 shows a schematic example of a rocket engine 1200 in accordance with an embodiment of the invention. In FIG. 4, rocket engine 1200 has a nozzle 1210 and a propellant supply system 1220. The propellant supply system supplies and ignites a fuel and nitrous oxide in accordance with the invention discussed above.

While the invention has been described with reference to particular embodiments and examples, those skilled in the art will appreciate that various modifications may be made thereto without significantly departing from the spirit and scope of the invention.

What is claimed is:

1. An apparatus for burning a fuel and nitrous oxide, the apparatus comprising:
    a combustor;
    a catalyst;
    a nitrous oxide supply passage for directing the nitrous oxide to a contact position with the catalyst; and
    a fuel supply passage for supplying the fuel to the combustor,
    wherein the catalyst is facilitating decomposition of the nitrous oxide at about 122° F. to 662° F. and the combustor is for burning the fuel and the decomposed nitrous oxide.

2. The apparatus of claim 1, wherein the fuel is a hydrocarbon.

3. The apparatus of claim 2, wherein the fuel is propane.

4. The apparatus of claim 1, further comprising a second fuel supply passage, the second fuel supply passage for supplying a portion of the fuel to the catalyst.

5. The apparatus of claim 4, wherein the second fuel supply passage is for supplying the portion of the fuel to the catalyst such that the portion of the fuel is an amount of the fuel sufficient to maintain a preferred catalyst activation temperature.

6. The apparatus of claim 1, wherein the catalyst is part of an amorphous mixture in a porous material stratum.

7. The apparatus of claim 6, wherein the porous material stratum is a sintered mesh disk.

8. The apparatus of claim 7, wherein the catalyst comprises one of platinum and rhodium.

9. The apparatus of claim 1, wherein the catalyst is iridium based.

10. The apparatus of claim 1, wherein the catalyst contain one of platinum, rhodium, tungsten carbide, copper, cobalt and gold.

11. The apparatus of claim 1, further comprising a nitrous oxide storage tank.

12. The apparatus of claim 11, wherein the nitrous oxide supply passage is for directing the nitrous oxide in a gaseous state.

13. The apparatus of claim 12, wherein the nitrous oxide storage tank is for storing the nitrous oxide in a liquid state.

14. The apparatus of claim 1, further comprising a swirl injector for injecting the fuel into the combustor in a direction containing a swirl component.

15. The apparatus of claim 1, further comprising a heating element for initially heating the nitrous oxide to a nitrous oxide decomposition temperature.

16. A rocket engine, comprising:
a nozzle;
a combustor; and
a propellant supply system having
a catalyst;
a nitrous oxide supply passage for directing nitrous oxide to a contact position with the catalyst; and
a fuel supply passage for supplying a fuel to the combustor,
wherein the catalyst is facilitating decomposition of the nitrous oxide at about 122° F. to 662° F. and
the combustor is for burning the fuel and the decomposed nitrous oxide.

17. The rocket engine of claim 16, wherein the fuel is a hydrocarbon.

18. The rocket engine of claim 17, wherein the fuel is propane.

19. The rocket engine of claim 16, further comprising a second fuel supply passage, the second fuel supply passage for supplying a portion of the fuel to the catalyst.

20. The rocket engine of claim 19, wherein the second fuel supply passage is for supplying the portion of the fuel to the catalyst such that the portion of the fuel is an amount of the fuel sufficient to maintain a preferred catalyst activation temperature.

21. The rocket of claim 16 wherein the catalyst is part of an amorphous mixture in a porous material stratum.

22. The rocket of claim 21, wherein the porous material stratum is a sintered mesh disk.

23. The rocket of claim 22, wherein the catalyst comprises one of platinum and rhodium.

24. The rocket engine of claim 16, wherein the catalyst is iridium based.

25. The rocket engine of claim 16, wherein the catalyst contain one of platinum, rhodium, tungsten carbide, copper, cobalt and gold.

26. The rocket engine of claim 16, further comprising a nitrous oxide stage tank.

27. The rocket engine of claim 26, wherein the nitrous oxide supply passage is for directing the nitrous oxide in a gaseous state.

28. The rocket engine of claim 27, wherein the nitrous oxide storage tank is for storing the nitrous oxide in a liquid state.

29. The rocket engine of claim 16, further comprising a swirl injector for injecting the fuel into the combustor in a direction containing a swirl component.

30. The rocket engine of claim 16, further comprising a heating element for initially heating the nitrous oxide to a nitrous oxide decomposition temperature.

31. A method of burning nitrous oxide and a fuel, the method comprising:
supplying the nitrous oxide to a catalyst;
facilitating decomposition of the nitrous oxide by passing the nitrous oxide over the catalyst at about 122° F. to 662° F.;
supplying the fuel to a combustion point; and
supplying the decomposed nitrous oxide to the combustion point.

32. The method of claim 31, wherein the fuel is a hydrocarbon.

33. The method of claim 32, wherein the fuel is propane.

34. The method of claim 31, wherein the decomposed nitrous oxide is a sufficient temperature to ignite the fuel.

35. The method of claim 31, further comprising supplying a portion of the fuel to the catalyst.

36. The method of claim 35, wherein the portion of the fuel supplied to the catalyst burns near the catalyst to provide heat to the catalyst.

37. The method of claim 36, wherein the heat provided to the catalyst by the portion of the fuel supplied to the catalyst is sufficient to maintain a preferred catalyst activation temperature.

38. The method of claim 31, wherein the catalyst is iridium based.

39. The method of claim 31, wherein the catalyst contain one of platinum, rhodium, tungsten carbide, copper, cobalt and gold.

40. The method of claim 31, wherein the nitrous oxide is supplied to the catalyst in a gaseous state.

41. The method of claim 31, wherein the nitrous oxide is stored in a liquid state.

42. The method of claim 31, further comprising injecting the fuel into the combustion point in a direction containing a swirl component.

43. The method of claim 31, further comprising initially heating the nitrous oxide to a nitrous oxide decomposition temperature.

44. The apparatus of claim 1, wherein the decomposition of the nitrous oxide occurs at about 400° F.

45. The apparatus of claim 3, wherein the decomposition of the nitrous oxide occurs at about 200° F.

46. The rocket engine of claim 16, wherein the decomposition of the nitrous oxide occurs at about 400° F.

47. The rocket engine of claim 19, wherein the decomposition of the nitrous oxide occurs at about 200° F.

48. The method of claim 31, wherein the decomposition of the nitrous oxide occurs at about 400° F.

49. The method of claim 35, wherein the decomposition of the nitrous oxide occurs at about 200° F.

50. An apparatus for burning nitrous oxide, comprising:
a nozzle;
a combustor; and
a propellant supply system having
a catalyst;
and a nitrous oxide supply passage for directing nitrous oxide to a contact position with the catalyst;
wherein the catalyst is facilitating decomposition of the nitrous oxide at about 122° F. to 662° F., and
combustor is for burning the decomposed nitrous oxide.

51. The apparatus of claim 50, wherein the catalyst is part of an amorphous mixture in a porous material stratum.

52. The apparatus of claim 51, wherein the porous material stratum is a mesh disk.

53. The apparatus of claim 52, wherein the catalyst comprises one of platinum and rhodium,.

54. The apparatus of claim 50, wherein the catalyst is iridium based.

55. The apparatus of claim 50, wherein the catalyst contain one of platinum, rhodium, tungsten carbide, copper, cobalt and gold.

56. The apparatus of claim 50, further comprising a nitrous oxide storage tank.

57. The apparatus of claim 56, wherein the nitrous oxide supply passage is for directing the nitrous oxide in a gaseous state.

58. The apparatus of claim 57, wherein the nitrous oxide storage tank is for storing the nitrous oxide in a liquid stag.

59. The apparatus of claim 50, further comprising a heating element for initially heating the nitrous oxide to a nitrous oxide decomposition temperature.

60. The apparatus of claim 50, wherein the decomposition of the nitrous oxide occurs at about 400° F.

61. A multi-mode propulsion system for providing propulsion for two or more of: a rocket boost, an attitude control system, a reaction control system, an orbital maneuvering system, or an auxiliary power unit, wherein the multi-mode propulsion system includes an apparatus according to claim 1.

62. A multi-mode propulsion system for providing propulsion for two or more of: a rocket boost, an attitude control system, a reaction control system, an orbital maneuvering system, or an auxiliary power unit, wherein the multi-mode propulsion system includes an apparatus according to claim 50.

* * * * *